United States Patent [19]

Ersfeld et al.

[11] 3,926,219
[45] Dec. 16, 1975

[54] INJECTION NOZZLE FOR FOAMING MACHINES

[75] Inventors: Heinrich Ersfeld; Klaus Nadolski, both of Bergisch-Neukirchen; Walter Schneider, Bensberg, Immenkaeppel; Klaus Schulte, Leverkusen; Heinrich Boden, Opladen, Luetzenkirchen, all of Germany

[73] Assignee: Bayer Aktiengesellschaft, Leverkusen, Germany

[22] Filed: Dec. 19, 1974

[21] Appl. No.: 534,318

[30] Foreign Application Priority Data

Dec. 24, 1973 Germany............................ 2364501

[52] U.S. Cl. ................... 137/625.49; 259/4; 259/8; 425/4 R; 425/245 R
[51] Int. Cl.² ........................................ F16K 11/07
[58] Field of Search... 137/625, 49; 425/4 R, 245 R, 425/245 NS, 217; 259/4, 8

[56] References Cited
UNITED STATES PATENTS

| | | | |
|---|---|---|---|
| 2,982,309 | 5/1961 | Read .......................... | 137/625.49 X |
| 3,165,120 | 1/1965 | Horowitz ..................... | 137/625.49 X |
| 3,207,486 | 9/1965 | Rosenthal ................... | 259/8 |
| 3,706,515 | 12/1972 | Keuerleber et al. ............ | 425/257 X |
| 3,788,337 | 1/1974 | Breer .......................... | 425/4 R X |
| 3,861,841 | 1/1975 | Hanning ...................... | 425/245 R X |

*Primary Examiner*—Henry T. Klinksiek
*Attorney, Agent, or Firm*—Joseph C. Gil

[57] ABSTRACT

An injecting nozzle for injecting reactants into the mixing chamber of a foam machine mixing head wherein the needle which seals the nozzle opening also controls the communication between the feed conduit and the return conduit of the recycle system. The needle by means of an annular groove carried on its shaft or on the nozzle housing or by "means" of annular grooves on both allows the reactants to recycle through the return conduit when the nozzle opening is sealed but prevents such recirculation when the nozzle opening is open. Thus, the recycle path and the pouring path are identical or almost so and any dynamic disturbance upon changing of modes is eliminated.

3 Claims, 4 Drawing Figures

INJECTION NOZZLE FOR FOAMING MACHINES

This invention relates to an injection nozzle for foaming machines, e.g. for the manufacture of polyurethane foam, which is designed to inject the reactants into the mixing chamber of a mixing head.

BACKGROUND OF THE INVENTION

Spring loaded nozzle needles which respond to pressure differences are still commonly used. The nozzles are closed by the pressure drop which is produced by the opening of backflow valves in the conduits of the circuit and opened by closure of the valves. In the latter case, the whole conduit system must be brought to that pressure at which the spring of the nozzle needle yields. This process is equivalent to an additional capacity of the conduit, which has a time shift effect. Consequently, the initial flow which builds up the opening pressure and finally lifts the nozzle needle from the nozzle seating by a cumulative effect also has a time shift effect. These asynchronous initial flows of the various components and the cumulative behavior of the mass-spring system of the injection nozzle are at present compensated by a so-called storage piston. This, however, introduces an additional mass-spring system with its own oscillation characteristics into the dynamically sensitively reacting system.

The larger the number of components or of injection nozzles which take part in the process, the more unlikely it is that all the components will show the same initial flow behavior, i.e. that the mixture obtained will conform to the given formulation. This undesirable phenomenon of a component racing ahead or lagging behind when the nozzles are opened or closed can thus hardly be avoided and results in faults in the finished product.

It has already been proposed to use positively controlled injection nozzles to prevent this racing ahead or lagging behind, but the return flow valves provided in the known injection nozzles of this kind are situated far in front in the conduit system so that, when the return flow valves are closed and the injection nozzles at the same time opened, the flow in the portions of conduit situated between the back flow valves and the injection nozzles has not yet come to rest and it is therefore impossible to ensure simultaneous inflow of the various components at the predetermined ratios per unit time at this initial stage which is particularly important. Similar problems arise when the system is switched over to return flow.

SUMMARY OF THE INVENTION

It is an object of this invention to provide an injection nozzle which ensures that the introduction of the various components are synchronized and the components will be introduced at the predetermined ratios.

This invention provides an injection nozzle for injecting reactants into the mixing chamber of a mixing head used with foaming machines. The nozzle comprises a nozzle needle supported in a housing which is provided with a feed conduit and a return conduit. The needle is controlled by a positive control device which is independent of the flow of reactants through the nozzle. One end of the needle cooperates with a nozzle opening to form a seal when the needle is in the inoperative position. This nozzle opening communicates with the feed conduit when the needle is in the operative position. The shaft of the nozzle needle and or the housing adjacent to the nozzle are provided with an annular groove by which the feed conduit communicates with the return conduit when the nozzle is in the inoperative position. The shaft of the needle interrupts the communication between the feed and the return conduits when the needle is in the operative position.

According to the invention, this problem is reduced or substantially solved by providing the shaft of the nozzle needle and/or the housing with an annular groove through which the feed conduit is connected with a return conduit in the inoperative position while in the operative position the shaft of the nozzle needle interrupts the connection between feed conduit and return conduit.

DETAILED DESCRIPTION OF PREFERRED EMBODIMENTS

In a first embodiment of the invention both the housing and the shaft of the nozzle needle are provided with annular grooves. The annular groove of the housing is immediately adjacent to the nozzle opening and at all times communicates with a transverse bore in the housing which is connected to the feed source of material such that the bore and the groove together constitute a feed conduit. The annular groove of the nozzle needle shaft is so placed that when the nozzle needle is in the inoperative (at rest) position it at least partially overlaps both the housing annular groove and a return conduit thus providing communication between the feed conduit and the return conduit. When the nozzle needle is in the operative position, the shaft groove is moved out of communication with either the feed conduit or the return conduit or both and an ungrooved portion of the nozzle needle shaft interrupts communication between the feed and return conduits.

By this arrangement, the injection needle forms the switching device both for inflow and for return flow. The special advantage of this is that in this embodiment the injection nozzle itself is permanently under the delivery pressure of the component so that this pressure will prevail immediately in front of the nozzle opening even when the nozzle is closed.

The nozzle opening is at all times, including during delivery through the circuit, kept at a constant temperature by the material flowing through or past it. This improves the tightness of the seal when the nozzle is closed as well as ensuring that the component delivered through the opening will undergo no change in its properties.

In a second embodiment of the invention a housing and a feed conduit essentially similar to that of the first embodiment are provided. However, a cross-channel extends from the bore portion of the feed conduit to a portion of the nozzle needle shaft distant from the nozzle opening. The shaft is provided with an annular groove positioned such that when the nozzle needle is in the rest mode it communicates with both the cross-channel and a return conduit. When the nozzle needle is in the operative position, the shaft groove is out of communication with either the cross-channel or the return conduit or both and an ungrooved portion of the needle nozzle shaft interrupts communication between the cross-channel and the return conduit.

In this embodiment, the change in flow path in switching from the operative to the rest mode is so small that it cannot cause any dynamic disturbances during the switching process.

The injection nozzle may be constructed out of any suitable material which may be shaped to the required configuration and can retain its shape when subjected to the pressures at which foam reactants are normally injected into a mixing chamber. Particularly suitable are metals which have reasonable strength and are readily machnined. Examples of such metals which are commercially available are aluminum alloys and steel alloys.

DESCRIPTION OF THE DRAWINGS

Two examples of the injection nozzle according to the invention are shown purely diagrammatically in section in the drawings in position in a mixing head and described below. In the drawings.

In FIGS. 1 and 2, a mixing head 1 is integrated in a molding tool 2. The mixing head 1 comprises the two injection nozzles 3 which extend from opposite directions into an associated mixing chamber 4. It opens into a mold cavity 6 by way of a sprue channel 5. The plane of separation 7 also extends through the mixing chamber 4 and sprue channel 5. Each injection nozzle 3 comprises a housing 8 supporting a nozzle needle 9. The tip 10 of the needle conforms to the tightly fitting seat 11 of the nozzle opening 12 in front of which the housing 8 has an annular groove 13 which together with a bore 14 in the housing forms the feed conduit for the component. The shaft 15 of the nozzle needle 9 has an annular groove 16 which is so arranged that when the nozzle is closed (FIG. 2) it overlaps the annular groove 13 of the housing 8 but is still within range of a return conduit 17 which leads out of the housing 8 and has a restrictor 18. The other end of the nozzle needle 9 is formed by a double action hydraulic piston 19 which is seated in a cylindrical enlargement 20. Hydraulic feed pipes and discharge pipes 21 and 22 open into this cylindrical cavity. The piston stroke is limited by an adjustable screw 23. A compression spring 24 is provided to keep the nozzle needle 9 in the closure position during rest periods.

In FIGS. 3 and 4, a mixing head 31 is integrated in a molding tool 32. The mixing head 31 comprises the two injection nozzles 33 which extend into an associated mixing chamber 34 from opposite directions. It opens into a mold cavity 36 by way of a sprue channel 35. The plane of separation 37 also extends through the mixing chamber 34 and sprue channel 35. Each injection nozzle 33 comprises a housing 38 in which a nozzle needle 39 is supported. The tip 40 of the needle conforms to the tightly fitting seat 41 of the nozzle opening 42 in front of which an annular groove 43 is arranged in the housing 38, which groove 43 together with a bore 44 in the housing forms the feed conduit for the component. A cross-channel 55 is branched from the bore 44 of the housing to the shaft 45 of the nozzle needle 39. The needle 39 has an annular groove 46 which is arranged so that it connects the cross-channel 55 to a return conduit 47 only when the nozzle is closed. This conduit 47 leads out of the housing 38 and has a restrictor 48. The other end of the nozzle needle 39 is formed by a double action hydraulic piston 49 which is seated in a cylindrical enlargement 50. Hydraulic supply pipes and discharge pipes 51 and 52 of a control device (not shown) open into this cylindrical cavity. The stoke is limited by an adjustable screw 53. A compression spring 54 is provided to keep the nozzle needle 39 in the closed position during rest periods.

Figure 1:
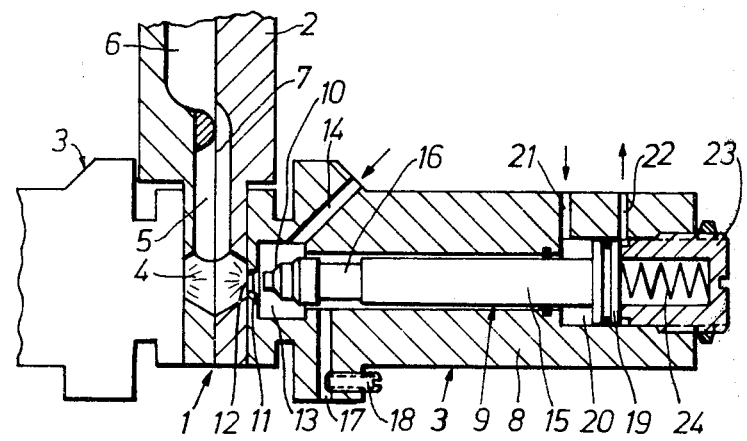
FIG. 1 shows a first example with the injection nozzle in the open position.
Figure 2:
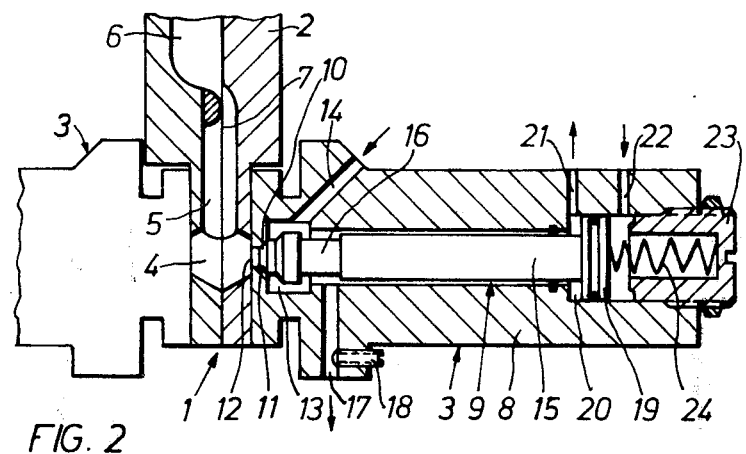
FIG. 2 shows the same example with the injection nozzle closed.
Figure 3:
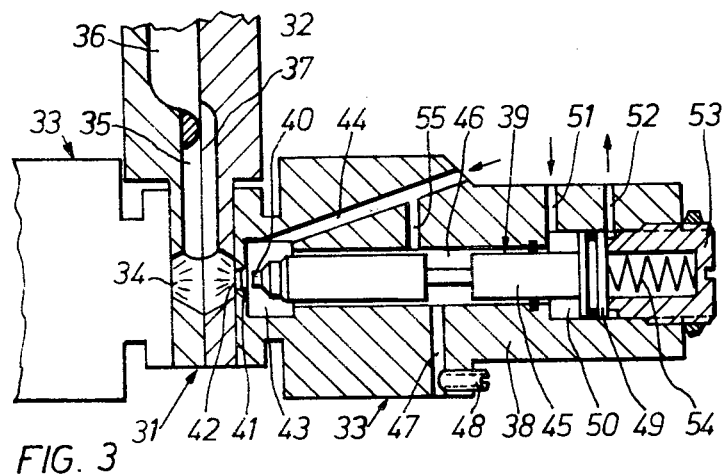
FIG. 3 shows a second example with the injection nozzle in the open position and FIG. 4 shows the same example with the injection nozzle closed.
Figure 4:
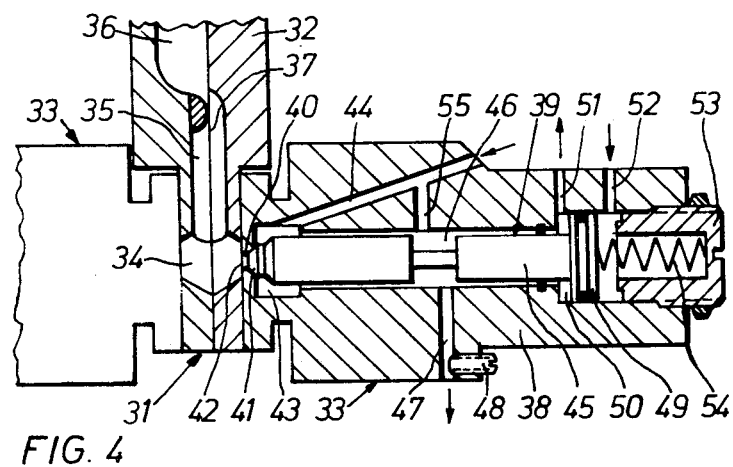

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An injection nozzle for injecting reactants into the mixing chamber of a foam machine mixing head which comprises a housing having a longitudinal bore adapted to receive a nozzle needle, a nozzle opening located in a traverse wall which terminates one end of said bore, a first traverse bore entering the longitudinal wall of the longitudinal bore at a point adjacent to said nozzle opening, a second traverse bore entering said longitudinal wall at a point remote from the point of entry of said first traverse bore and an annular groove immediately adjacent to said traverse wall; and a nozzle needle slidingly disposed within said longitudinal bore of the housing and having one end adapted to sealingly engage said nozzle opening and the other end coupled to a positive control means for moving said needle a preset longitudinal distance into or out of engagement with said nozzle opening;

said nozzle needle being provided with an annular groove so positioned that when the nozzle needle is in sealing engagement with the nozzle opening the annular groove provides communication between said first traverse and said second traverse bores and when said nozzle needle is moved its preset distance out of engagement they provide no communication between said traverse bores.

2. The injection nozzle of claim 1 wherein a cross-channel extends from said first traverse bore to the longitudinal wall of the longitudinal bore at a point distant from the nozzle opening and the nozzle needle is provided with an annular groove so positioned that it provides communication between said cross-channel and said second traverse bore when the needle is in sealing engagement with the nozzle opening and it does not provide such communication when the nozzle needle is moved its preset distance out of engagement.

3. An injection nozzle for injecting reactants into the mixing chamber of a foam machine mixing head which comprises a housing having a longitudinal bore adapted to receive a nozzle needle, a nozzle opening located in a traverse wall which determines one end of said bore and a first traverse bore entering the longitudinal wall of the longitudinal bore at a point adjacent to said nozzle opening and a second traverse bore entering said longitudinal wall at a point remote from the point of entry of said first traverse bore and an annular groove immediately adjacent to said traverse wall; and a nozzle needle slidingly disposed within said longitudinal bore of the housing and having one end adapted to sealingly engage said nozzle opening and the other end coupled to a positive control means for moving said needle a preset longitudinal distance into or out of engagement with said nozzle opening;

said nozzle needle being provided with an annular groove so positioned that when the nozzle needle is in sealing engagement with the nozzle opening the annular groove provides communication between said first traverse and said second traverse bores and at least partially overlaps said housing annular groove but when said nozzle needle is moved its preset distance out of engagement it provides no communication between said traverse bores.

* * * * *